(12) United States Patent
Saldana

(10) Patent No.: US 7,696,462 B2
(45) Date of Patent: Apr. 13, 2010

(54) ADVANCED IMAGE INTENSIFIER ASSEMBLY

(76) Inventor: Michael R. Saldana, 1965 Post Rd., #507, New Braunfels, TX (US) 78130

( * ) Notice: Subject to any disclaimer, the term of this patent is extended or adjusted under 35 U.S.C. 154(b) by 0 days.

(21) Appl. No.: 12/262,156

(22) Filed: Oct. 30, 2008

(65) Prior Publication Data

US 2009/0108180 A1 Apr. 30, 2009

Related U.S. Application Data

(60) Provisional application No. 61/001,022, filed on Oct. 30, 2007.

(51) Int. Cl.
*H01J 40/14* (2006.01)
*H01J 43/00* (2006.01)
(52) U.S. Cl. ............................. 250/207; 250/214 VT; 313/525; 313/103 CM
(58) Field of Classification Search ............... 250/207, 250/214 VT, 473.1, 474.1; 313/523–105 CM
See application file for complete search history.

(56) References Cited

U.S. PATENT DOCUMENTS

| 4,163,174 | A | * | 7/1979 | Johnson ....................... 315/10 |
| 4,195,222 | A | * | 3/1980 | Fouilloy ................ 250/214 VT |
| 4,985,773 | A | * | 1/1991 | Gilligan et al. ............. 348/217.1 |
| 5,146,077 | A | * | 9/1992 | Caserta et al. ........ 250/214 VT |
| 5,204,522 | A | * | 4/1993 | Takahashi et al. ..... 250/214 VT |
| 5,336,881 | A | * | 8/1994 | Caserta et al. ........ 250/214 VT |
| 5,393,972 | A | * | 2/1995 | Suyama et al. ........ 250/214 VT |
| 5,453,782 | A | * | 9/1995 | Hertel ..................... 348/217.1 |
| 5,883,381 | A | * | 3/1999 | Saldana ................ 250/214 VT |
| 5,892,617 | A | * | 4/1999 | Wallace ..................... 359/353 |
| 5,907,150 | A | * | 5/1999 | Saldana ................ 250/214 VT |
| 5,949,063 | A | * | 9/1999 | Saldana et al. ........ 250/214 VT |
| 6,075,644 | A | | 6/2000 | Filipovich |
| 6,087,649 | A | * | 7/2000 | Estrera et al. ......... 250/214 VT |
| 6,121,600 | A | * | 9/2000 | Saldana et al. ........ 250/214 VT |
| 6,140,574 | A | * | 10/2000 | Snyder ........................ 174/368 |
| 6,172,708 | B1 | * | 1/2001 | Palmer ..................... 348/217.1 |
| 6,278,104 | B1 | * | 8/2001 | Saldana et al. ........ 250/214 VT |
| 6,297,494 | B1 | * | 10/2001 | Estrera et al. ......... 250/214 VT |
| 6,320,180 | B1 | * | 11/2001 | Estrera et al. ......... 250/214 VT |
| 6,486,461 | B1 | * | 11/2002 | Saldana et al. ........ 250/214 VT |
| 6,690,098 | B1 | * | 2/2004 | Saldana ....................... 307/125 |
| 7,274,910 | B2 | * | 9/2007 | Gilbert et al. ............... 455/41.2 |
| 7,368,699 | B2 | * | 5/2008 | Shamir et al. ......... 250/214 VT |
| 2002/0075210 | A1 | | 6/2002 | Nestorovic et al. |
| 2002/0088925 | A1 | | 7/2002 | Nestorovic et al. |

(Continued)

*Primary Examiner*—John R Lee
(74) *Attorney, Agent, or Firm*—Jackson Walker LLP; Mark H. Miller; Sean C. Crandall

(57) ABSTRACT

An advanced image intensifier assembly provides enhanced functionality. A grounded photocathode provides shielding from electromagnetic interference, improving the ability to work in multiple light conditions. Bi-directional wireless communication and non-volatile storage allow critical information to be permanently stored and read wirelessly at a scanning station, easing in identification of units. Because bi-directional communication components can be embedded within an image intensifier assembly, existing end-user night vision devices can be upgraded by simply replacing the image intensifier assembly. For enhanced safety, a programmable shutdown capability is provided. This renders the device inoperative in the absence of continuous input, either wireless or manual, from an authorized operator, thus rendering the device useless if captured by enemy combatants. Finally, direct 1-volt operation enables the device to be powered by, for example, a single AA battery.

10 Claims, 7 Drawing Sheets

U.S. PATENT DOCUMENTS

| | | |
|---|---|---|
| 2002/0122258 A1 | 9/2002 | Moody |
| 2002/0135872 A1 | 9/2002 | Choinere |
| 2004/0094700 A1 | 5/2004 | Filipovich et al. |
| 2005/0176373 A1* | 8/2005 | Gilbert et al. ............... 455/41.2 |
| 2006/0081793 A1 | 4/2006 | Nestorovic et al. |
| 2007/0023617 A1 | 2/2007 | Thomas |
| 2007/0064109 A1* | 3/2007 | Renkis ....................... 348/159 |
| 2007/0267567 A1 | 11/2007 | Filipovich et al. |
| 2008/0157000 A1 | 7/2008 | Shamir et al. |
| 2009/0092284 A1* | 4/2009 | Breed et al. .................. 382/103 |
| 2009/0108180 A1* | 4/2009 | Saldana ................ 250/214 VT |
| 2009/0109003 A1* | 4/2009 | Tucker et al. ............... 340/10.1 |

* cited by examiner

ADVANCED IMAGE INTENSIFIER ASSEMBLY

CROSS REFERENCE TO RELATED APPLICATIONS

This application claims priority to U.S. provisional application 61/001,022 filed Oct. 30, 2007 entitled "Advanced Image Intensifier Assembly," which is hereby incorporated by reference. U.S. patent application Ser. No. 12/205,751, entitled "Image Intensifier with Adjustable Figure of Merit," is also hereby incorporated by reference.

BACKGROUND

This specification relates to the field of night vision devices, and more particularly to an advanced image intensifier.

Image intensifiers are used in night vision devices to enhance images in low light conditions. As a general principle of operation, photons representing an image are converted into electrons, which are then substantially amplified, and finally the enhanced electron stream is again converted to photons on a phosphorescent screen, yielding a green image. There are at least four recognized "generations" of night vision technology, with the generations characterized by increasing range and clarity of images.

Up until the late 1990's image intensifiers incorporated non-gated power supply technology. The advent of gating power supplies (known in the night vision industry as "auto-gated power supplies", referring to the fact that they incorporated feedback and control circuitry to automatically vary the duty cycle of the photocathode gating signal in response to operating levels within the image intensifier), enabled "unfilmed" image intensifier technology and improved the performance of image intensifiers in daylight conditions.

But there are problems with currently available auto-gated power supplies. The primary disadvantage is electromagnetic interference (EMI). Because of the fast rise and fall edges of the high voltage gating signal, high EMI emissions result, making it difficult and expensive to meet the requirements of military night vision EMI specifications. The EMI emissions from an image intensifier incorporating a currently-available auto-gated power supply emanate primarily from the front face of the image intensifier. This is because the high voltage gating signal that is applied to the photocathode causes it to radiate from its full active area. Because of the EMI disadvantages, night vision manufacturers have, in many cases, been prevented from achieving fast enough rise and fall times to enable gating duty cycles low enough (less than 0.001%) for full daylight operation.

SUMMARY OF THE INVENTION

Figure 1:
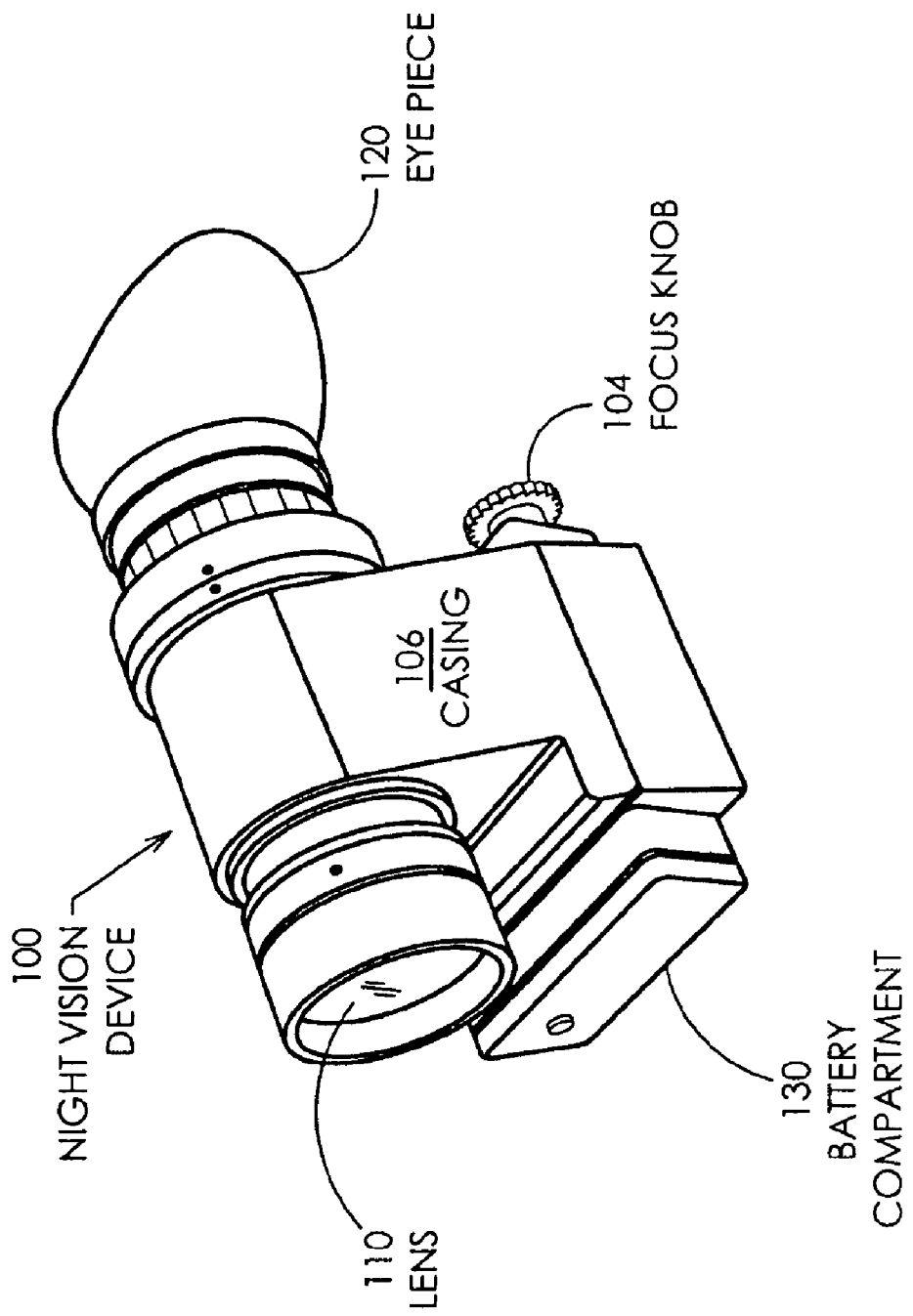
FIG. 1 is a perspective view of a night vision device.

In one aspect, an advanced image intensifier assembly provides enhanced functionality. A grounded photocathode provides shielding from electromagnetic interference, improving the ability to work in multiple light conditions. Bi-directional wireless communication and non-volatile storage allow critical information to be permanently stored and read wirelessly at a scanning station, easing identification of units. Because bi-directional communication components can be embedded within an image intensifier assembly, existing end-user night vision devices can be upgraded by simply replacing the image intensifier assembly. For enhanced safety, a programmable shutdown capability is provided. This renders the device inoperative in the absence of continuous input, either wireless or manual, from an authorized operator, thus rendering the device useless if captured by enemy combatants. Finally, direct 1-volt operation enables the device to be powered by, for example, a single AA battery.

DETAILED DESCRIPTION OF THE EMBODIMENTS

A night vision device according to the present specification may include an image intensifier module self-contained in a tube and comprising a photocathode, a microchannel plate, and a screen, which may be a phosphorescent screen. The image intensifier is powered by a high-voltage power supply, which in some embodiments is in a wrap-around configuration, and which may be encased in epoxy or other protective material. The power supply may provide at least one gated voltage. In the prior art, it is common to provide a gated voltage to the photocathode. In at least some cases, this proved problematic for image intensifiers intended for use in various light conditions. In particular, daylight operation requires a short duty cycle. But short rise and fall times resulted in excessive EMI. In contrast, the present specification discloses an arrangement whereby the MCP voltage is gated instead of the photocathode voltage. The photocathode is fixed at or near a reference voltage, which may be a chassis ground. This permits the grounded photocathode to act as an EMI shield, thus enabling faster rise and fall times, and shorter duty cycles, for daylight operation.

In another aspect of the present specification, an image intensifier module may include an image enhancement subsystem comprising a power supply, a photocathode, an MCP, and a screen. The image intensifier may further be equipped with a communication device, such as a radio frequency identification (RFID) chip, in communication with a processor capable of reading values from a non-volatile memory. The non-volatile memory may contain information about the image intensifier, and the processor may be programmed to transmit the information upon receipt of an excitation signal, which is defined herein as any signal intended to initiate communication with a communication device. For example, when the image intensifier module comes near an RFID reader, it may receive an excitation signal from the RFID reader, and in response, may transmit information about the image intensifier. For example, certain classes of night vision devices may be subject to import and/or export controls. An image intensifier could include memory in which is stored information indicative of the class and capabilities of the device. To prevent tampering, this could be provided on a read-only memory (ROM), which can be encased in epoxy. When the image intensifier passes a checkpoint with an RFID reader, the RFID reader can immediately and automatically identify the device and its capabilities, and determine whether it is authorized for import or export. Other important information, such as serial number, manufacture date code, total operation hours, etc., can be stored and read wirelessly using an RFID reader or other scanning station.

In yet another aspect of the present specification, an image intensifier may be provided with additional security measures, which may be tied to the two-way communication described in the last paragraph. These security measures may take the form of an automatic shutdown feature. For example, a countdown timer may be provided, which is reset by receiving a signal via the RFID interface, by some manual input, or by some other means. If the proper signal is not received within a given amount of time, the image intensifier will either shut down or operate in a degraded mode. So if the device is recovered by hostile forces, they will be prevented from using it altogether, or at least will be forced to use it in a degraded operating mode. This can provide friendly forces with a level of assurance that their technology will not be used against them. If a degraded mode of operation is desired after a timeout, it can be achieved by reducing the power supply voltage, thereby reducing the figure of merit (FOM). One method of doing so is described in U.S. patent application Ser. No. 12/205,751, "Image Intensifier with Adjustable Figure of Merit."

Advantageously, many of the methods described above can be incorporated into a modular image intensifier tube, which can be used as a drop-in replacement in many existing night vision systems. This enables existing systems to be quickly and easily upgraded.

Additional advantages can be realized by taking a whole-system approach. In particular, existing systems use a power supply that requires two AA batteries to operate. Some prior art devices have enabled single-battery operation by providing an intermediate step-up voltage regulator. But this solution is inefficient, and adds cost and weight to the system. By modifying the power supply of the image intensifier itself, the present system can be enabled to operate on a single AA battery, thereby providing greater efficiency, a streamlined profile of the overall system, and cost and weight savings compared the previously available two cell systems.

An advanced image intensifier will now be described with more particular reference to the attached drawings. Hereafter, details are set forth by way of example to facilitate discussion of the disclosed subject matter. It should be apparent to a person of ordinary skill in the field, however, that the disclosed embodiments are exemplary and not exhaustive of all possible embodiments.

Figure 2:
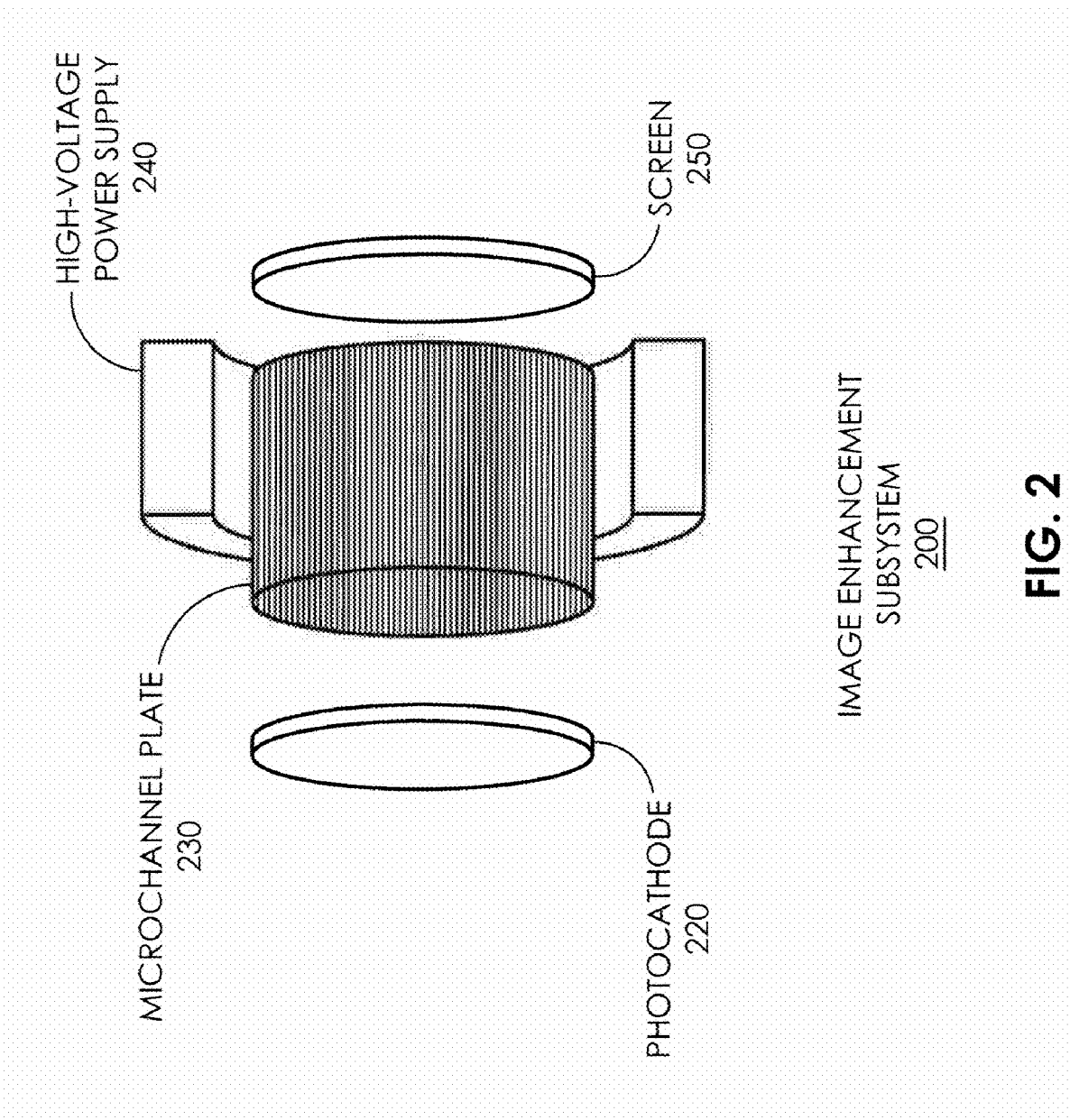
FIG. 2 is a block diagram of the major components of an image enhancement subsystem, forming a part of an image intensifier module for use with a night vision device.

FIG. 1 is a perspective view of a night vision device 100, which may be used with an image intensifier in accordance with the present specification. Externally visible in night vision device 100 is a lens 110, through which light passes to the image intensifier module 202 (FIG. 2A), which is encased by casing 106. At a removed end from lens 110 is eye piece 120, through which a user may view the enhanced image as displayed on the phosphorescent screen 250 (FIG. 2). A focus knob 104 may also be provided for the user to better focus the image. A battery compartment 130 may be adapted to hold one or more batteries, such as a AA battery.

FIG. 2 is a block diagram of the major components of an image enhancement subsystem 200, forming a part of an image intensifier module 202 (FIG. 2A) for use with a night vision device 100 (FIG. 1). The primary components are a photocathode 220, which may be a gallium arsenide (GaAs) photocathode, an MCP 230, a screen 250, and a high-voltage power supply 240.

When illuminated by an incident photon image, the photocathode (for example, an $Al_{1-x}Ga_xAs$/GaAs heterostructure) converts the input photons into electrons with high quantum efficiency and emits these electrons into the vacuum envelope 260 (FIG. 2A) between the photocathode 220 and MCP 230. The electrons are accelerated toward the MCP 230 by an applied voltage to the photocathode 220, typically between −600V and −900V with respect to the input face of the MCP 230. The MCP 230 is a glass plate through which millions of tiny, closely spaced cylindrical channels are bored. The MCP 230 is coated with a special substance that produces secondary electron emission when impinged upon by an electron. Due to a potential difference applied across the MCP 230 (typically between 900V and 1000V), an incident electron enters a channel and frees other electrons from the channel wall. These electrons are accelerated along the channel in turn striking the channel surface again and again, giving rise to more and more electrons. Eventually, this cascade process yields a cloud of up to several thousand electrons, which emerge from the rear of the plate. The electrons exiting the MCP 230 are accelerated toward by a bias potential (typically 4000V to 4500V) and their energy is converted back to light by the phosphor layer on the screen. Electrons exiting the microchannel plate strike a phosphor that emits light proportional to the amount of electrons hitting it. Due to the close proximity of foregoing elements, any image that is projected onto the photocathode surface 220 is preserved throughout the image intensification process. The image is green because the selected phosphor glows green when charged. The green color is selected because the human eye can differentiate more shades of green than any other color.

Figure 2A:
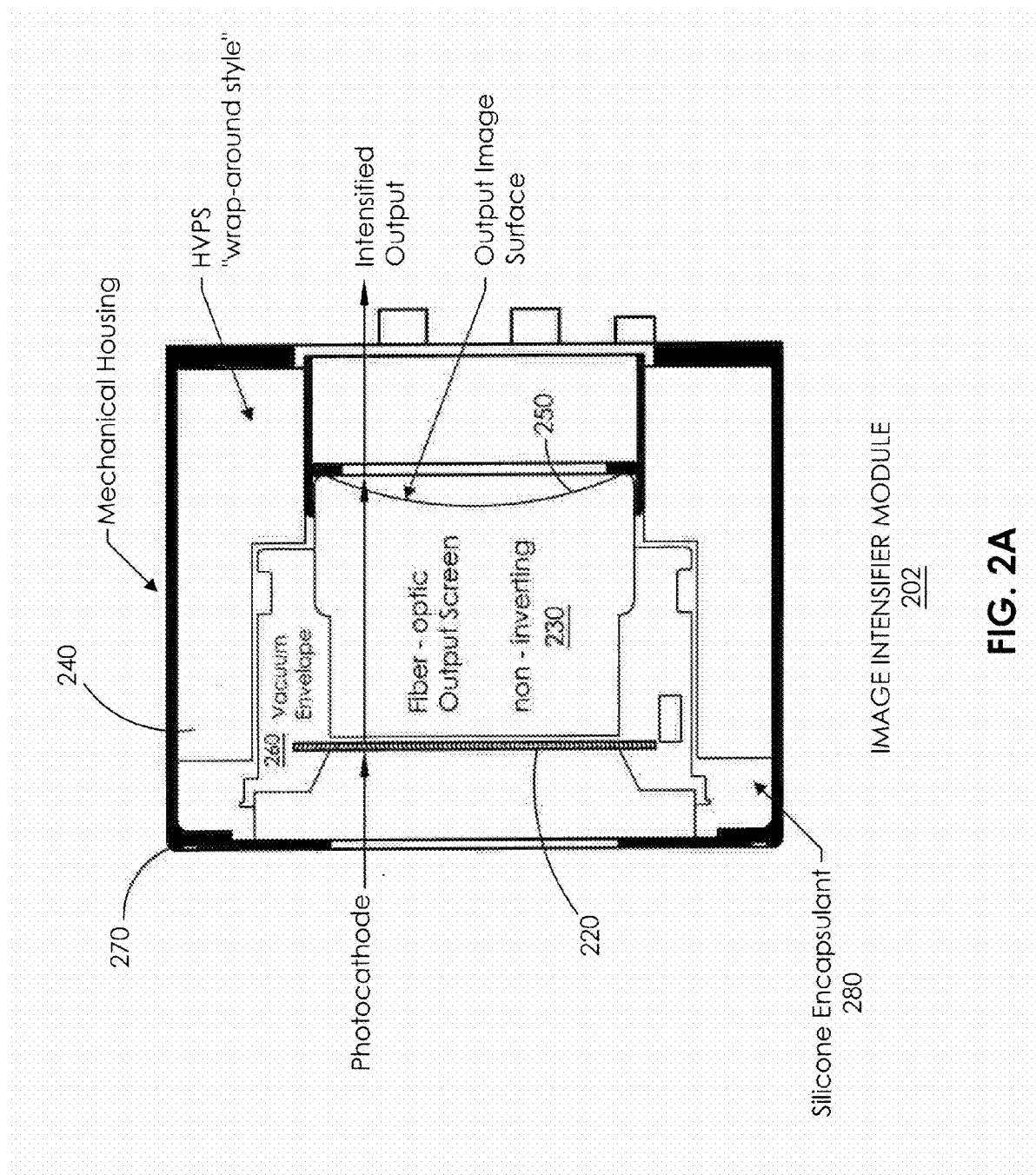
FIG. 2A is a diagram of an embodiment of an image intensifier disclosing the relative positioning of the components.

FIG. 2A is a diagram of an embodiment of an image intensifier module 202 disclosing the relative positioning of the components. It can be seen in this view that photons enter through the photocathode 220, which is optically coupled to the MCP 230. The MCP 230 is optically coupled to the screen 250, which provides human-viewable green image. High-voltage power supply 240 is wrapped around photocathode 220, MCP 230, and screen 250, and may encapsulated in epoxy or other protective substance. A vacuum envelope 260 surrounds part of MCP 230. An encapsulant 280, for example of silicone, may encase the structure for protection. The entire assembly may then be provided with a mechanical housing 270. Materials for mechanical housing 270 include, for example, plastic and conductive metal. If mechanical housing 270 is constructed of conductive metal, it may be grounded to provide additional EMI shielding.

Figure 3:
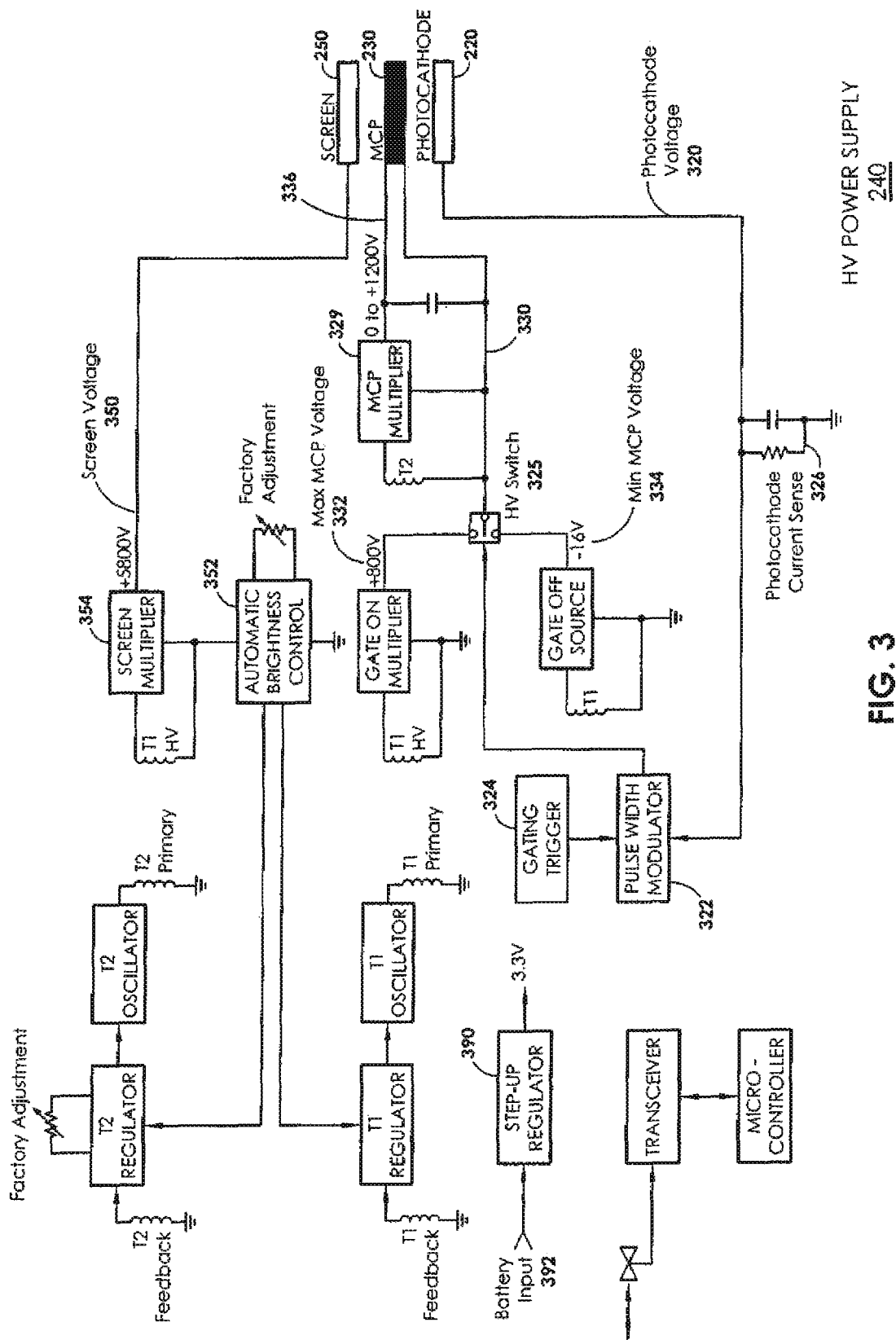
FIG. 3 is a block diagram electrical schematic of an image intensifier constructed in accordance with the present specification.
Figure 4:
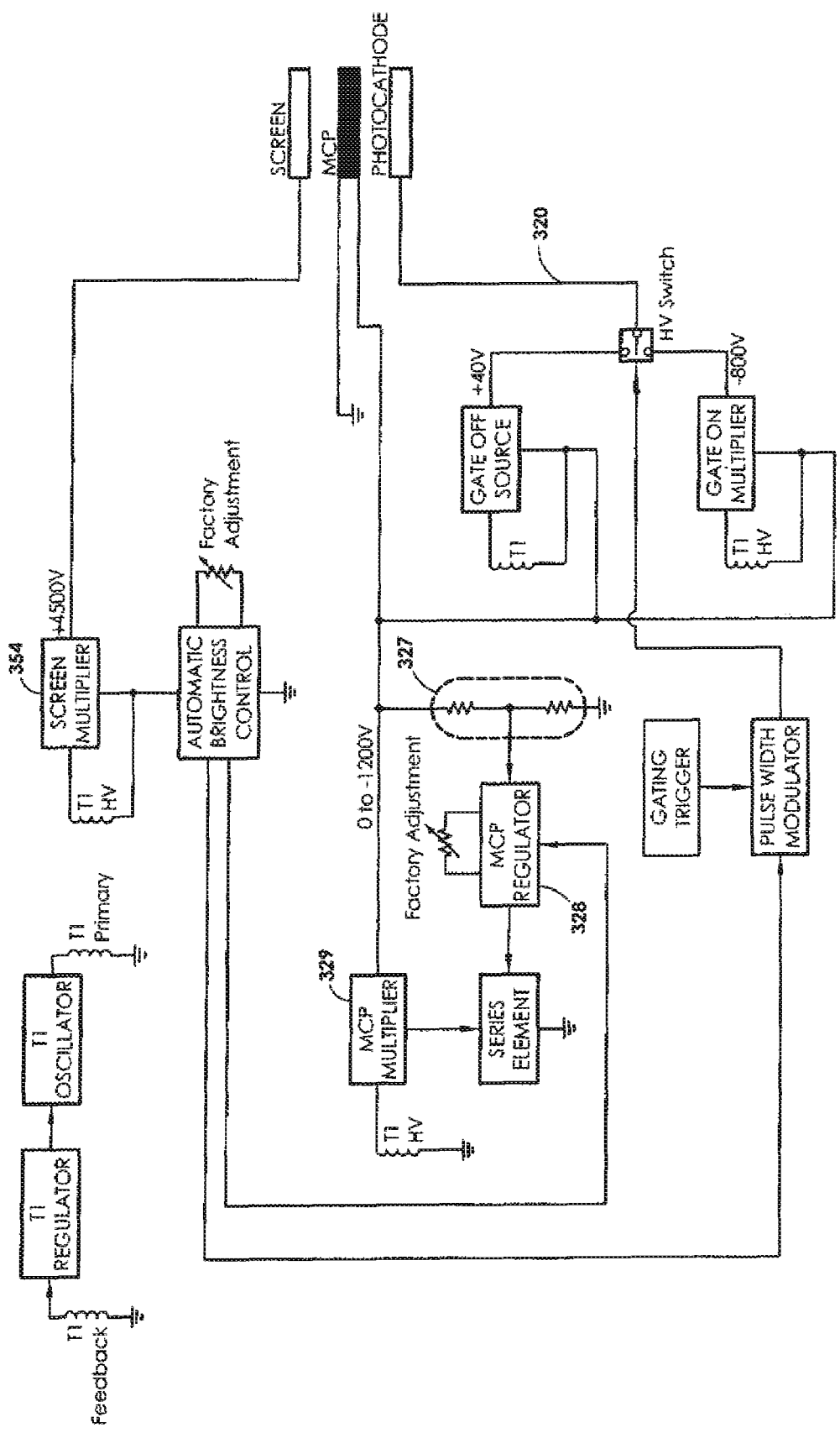
FIG. 4 is a block diagram electrical schematic of a prior art image intensifier.

FIGS. 3 and 4 are block diagram electrical schematics. FIG. 3 is a schematic of an image intensifier constructed in accordance with the present specification, and FIG. 4 is a block diagram of a prior art system, provided for purposes of contrast. In the prior art, the image intensifier is gated ON by switching the photocathode voltage 320 to a typical value of −800V with respect to the MCP input. This creates an electrostatic field that accelerates the photoelectrons emanating from the photocathode toward the MCP 230. Conversely, the image intensifier is gated OFF by the switching of the photocathode voltage 320 to +40V with respect to the MCP input.

In the present specification, the photocathode voltage 320 does not switch. Instead, it is kept at a DC value at or near ground potential. Image intensifier gating is accomplished by switching the MCP input voltage 330 between +800V (ON)

332 and −16V (OFF) 334. Note that these ON and OFF values are an example. Effective ON operation could be any value from +100V to +1000V. Additionally, the OFF value can be any value from 0 to −1000V. In this invention, keeping the photocathode at a DC level eliminates it as a source for EMI electric field emissions, which has proven in the prior art to be a severely limiting characteristic.

In both the prior art and this invention, the duty cycle of the high voltage gating signal is regulated by way of a pulse width modulator (PWM) 322 controlling the high voltage switch. The PWM 322 uses an input from the gating trigger 324 as a time base generator. In the prior art, the duty cycle of the high voltage gating signal is adjusted by the PWM 322 in response to a signal from the automatic brightness control (ABC) circuit 352, which senses the average screen current and provides output control signals to maintain this screen current at a substantially constant level once it goes higher than a predetermined factory adjustable level in response to increase in input illumination. However, in the present specification, the PWM 322 adjusts the duty cycle of the high voltage gating signal in response to the photocathode current as sensed by the photocathode sense resistor 326 in order to maintain a constant average photocathode current level as the illumination level increases above a certain predetermined level defined by PWM 322. This predetermined level is a value that is low enough to provide protection for the cathode from being overdriven, typically between 10 nA and 100 nA.

In the prior art, MCP voltage regulation is accomplished by way of a low-side series regulator 328 in the return path of the MCP high voltage multiplier 329. A fixed high voltage AC is generated from the T1 transformer for input into the MCP multiplier 329. The series regulator 328 operates by maintaining the proper impedance between ground and the return terminal of the high voltage multiplier 329 in response to the feedback voltage from the voltage divider 327 sampling the output voltage. It is this MCP voltage that is used to set the image intensifier assembly to the proper operating gain (typically 50,000 in military applications).

In contrast, according to the present specification, the MCP multiplier is referenced to the output of the high voltage gating switch 325, which is connected to MCP input 330. The output of the MCP multiplier 329 provides a positive DC bias potential across the MCP 230. In other words, MCP multiplier 329 selects a positive DC bias potential between MCP output 336 and MCP input 330, which will vary between 0V and +1200V, depending on ambient brightness. To maintain a constant DV voltage across MCP 230, MCP output voltage 336 is switched in phase with MCP input voltage 330. MCP output voltage 336 is regulated indirectly through regulation of the T2 transformer amplitude using a feedback winding sensed by the T2 regulator. The MCP voltage is externally adjustable by way of a user potentiometer. (Note that a mechanical potentiometer is only an example of external adjustment method; a digital means, such as a digital potentiometer or any other method to provide user interface and a command signal for the MCP regulator is within the scope of this specification). Additionally, automatic internal adjustment is provided by the automatic brightness control circuit 354, which senses the screen current and provides output control signals to maintain this screen current at a substantially constant level once it goes higher than a predetermined factory adjustable level in response to increase in input illumination.

In the prior art, screen voltage is provided by the ground-referenced screen multiplier 352. A fixed high voltage winding in T1 drives this multiplier 354. This screen multiplier output voltage is regulated indirectly through regulation of the T1 transformer amplitude using a feedback winding sensed by the T2 regulator.

In contrast, according to this specification, the screen multiplier 354 is also ground referenced; however, since MCP output 336 is switching, the output voltage of the screen multiplier is held at a higher value than in the prior art, approximately +5800V, in order to provide the proper accelerating voltage during the image intensifier gating. This accelerating voltage is the voltage differential between the MCP output voltage 336 and the screen, which is equal to +5800V minus the voltage difference between MCP output 330 and MCP input 336. Therefore, during the gate ON condition, using a typical MCP output voltage 336 of 900V with respect to MCP input voltage 330, and gate ON bias of 800V, the accelerating potential between the MCP and screen is +5800V minus (900V plus 800V), or 4100V, which is a typical operating potential for modern image intensifiers. To prevent excessive bias potential between the MCP and screen during ABC regulation, the ABC circuit 352 provides a signal to reduce the T1 amplitude to reduce the screen according to the amount of MCP voltage reduction.

Note that in this invention the fundamental difference in the referencing scheme for the tube elements allows the photocathode and screen elements of the image intensifier to be used as EMI shields for the MCP, the high speed switching element, which greatly reduces the radiated EMI emissions, thereby enabling very fast rise/fall times and thus very short ON pulses necessary to protect the photocathode from being overdriven.

Figure 5:
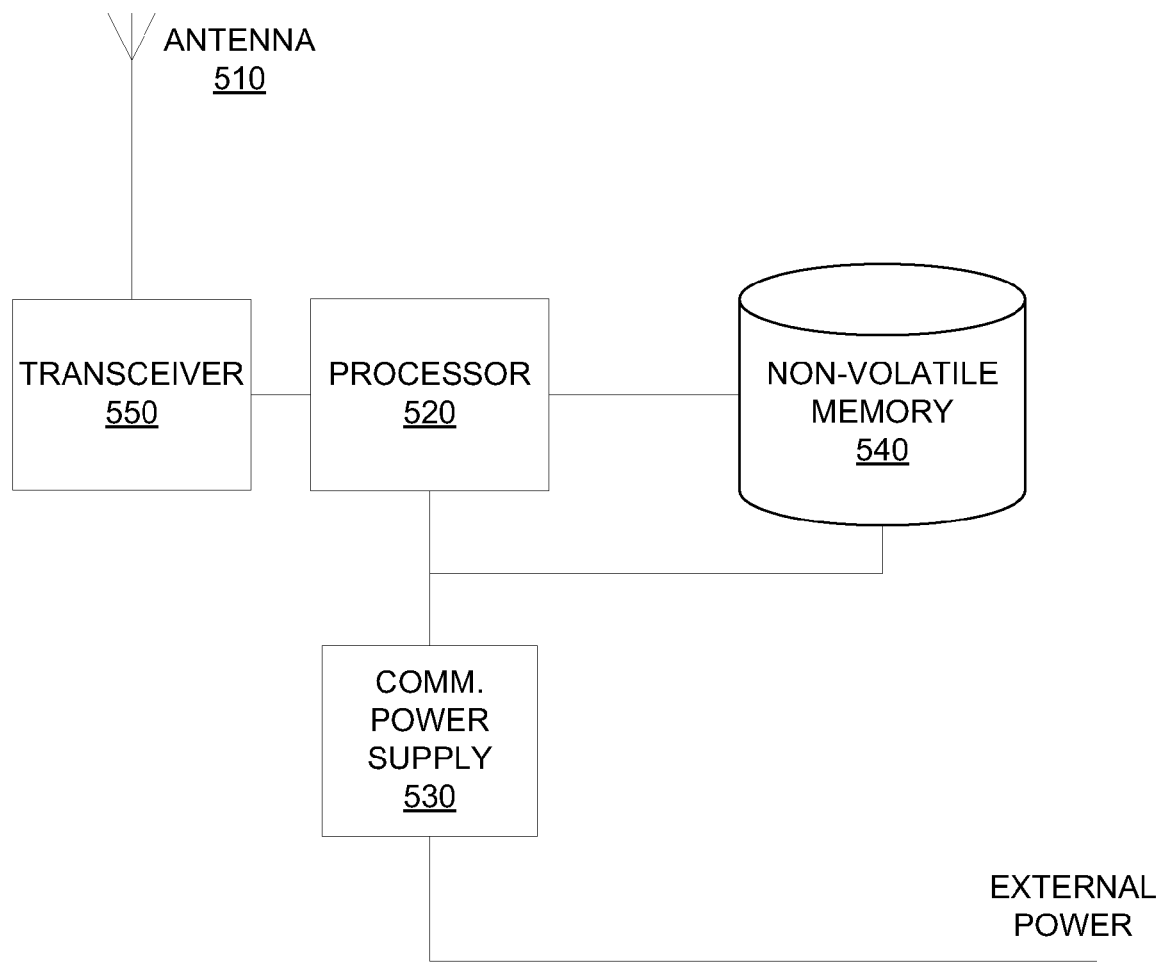
FIG. 5 is a block diagram of a communication device that may be used with or integrated in a image intensifier in accordance with the present specification.

FIG. 5 is a block diagram of a communication device 500 that may be used with or integrated in an image intensifier in accordance with the present specification. A communication power supply 530 is provided, which may receive power from an external source, such as a battery powering the image enhancement subsystem 200. Communication power supply 530 provides power to non-volatile memory 540, processor 520, and transceiver 550. Non-volatile memory 540 may contain data about the image intensifier, for example, data that represent its class and capabilities. Processor 520 may be a microprocessor, microcontroller, or any general or special-purpose logic device, including programmable devices and application-specific integrated circuits. Transceiver 550 may be a physical device providing transmit and receive functions, or a logical function of processor 520.

In one exemplary embodiment, when an excitation signal is received on a antenna 510 (which may be received when the device is near an RFID receiver), processor 520 reads a serial number and capability information from non-volatile memory 540. These data are sent to transceiver 550, which drives a signal on antenna 510. This signal can then be received by whatever device initiated the excitation signal.

In another exemplary embodiment, non-volatile memory 540 may be a write-once, read-many (WORM) device. After image intensifier modules are manufactured, each can be remotely with remote signals. The information is thus permanently fixed, to prevent tampering. This allows information such as serial number, date code and other manufacturing information to be written to and stored in the image intensifier for easy recall alter.

Figure 6:
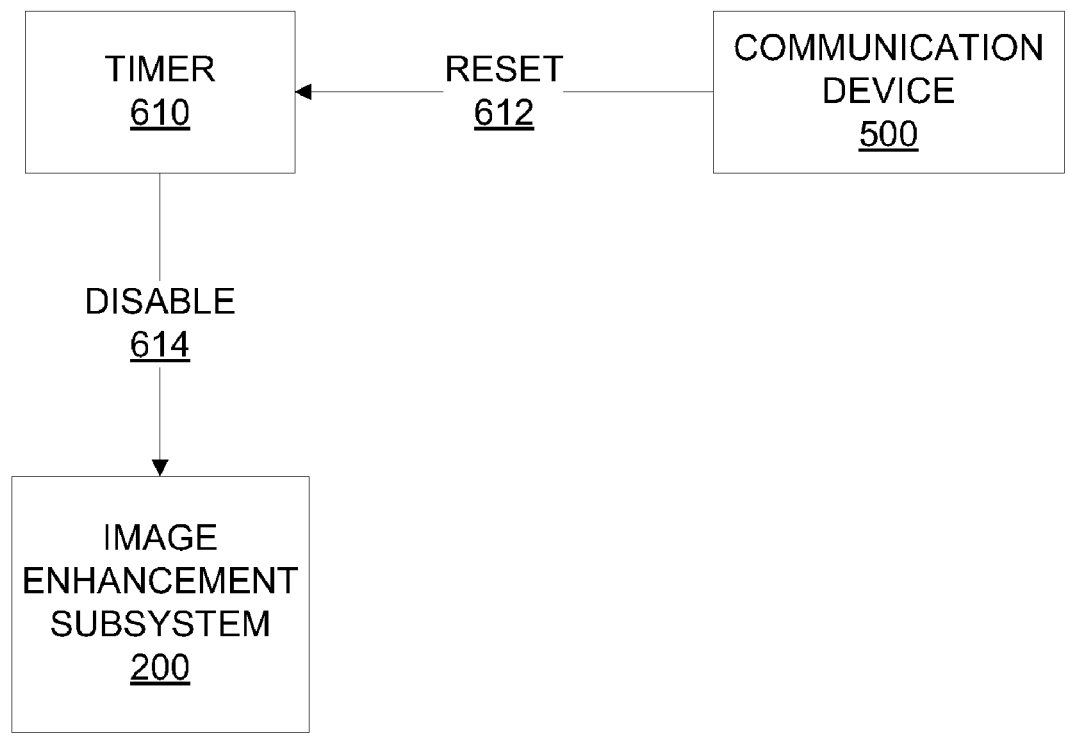
FIG. 6 is a block diagram of logical interconnections for performing a timeout function in accordance with the present specification.

FIG. 6 is a block diagram of logical interconnections for performing a timeout function in accordance with the present specification. A timer 610 is provided, which may be a logical function of processor 520 (FIG. 5), or a separate device. Communication device 500 may provide periodic "RESET" signals 612. The RESET signals 612 may be the result of RF communications, or may be provided by manual input. If timer 610 reaches a timeout (having not received a RESET signal for a specified time), it may then send a "DISABLE" signal 614 to image enhancement subsystem 200, causing it to enter a disabled state.

In one exemplary embodiment, an authorized user of night vision device 100 carries an RFID chip that is capable of communicating with communication device 500. The user's RFID chip periodically sends a signal to communication device 500, causing communication device 500 to send the RESET signal 612 to timer 610. As long as timer 610 continues to receive RESET signals 612, night vision device 100 continues to operate normally. But if the authorized user loses night vision device 100, it will no longer receive RESET signals 612. When timer 610 counts down to zero, it sends a DISABLE signal 614 to image enhancement subsystem 200.

In another exemplary embodiment, a portion of non-volatile memory 540 (FIG. 5) is programmable by means of two-way communication over antenna 510 (FIG. 5), which communication may be encrypted or otherwise secured in some cases. The image enhancement subsystem 200 can thus be programmed to time-out on one of several pre-selected events. For example, it can be programmed to shut down after a simple time duration (in which case, no RESET signals will be received), a personal identification input such as fingerprint or retinal identification, or in the absence of periodic wireless commands. The shutdown capability may be accomplished by redundant shutdown commands of various control signals within the image intensifier's power supply.

The disabled state may take various forms. For example, in some embodiments, the device may initiate a destructive shutdown, for example by blowing an internal fuse encased within the power supply. This kind of shutdown would be difficult or impossible to effectively recover from, and would operate on the theory that it is best to completely destroy the device if it falls into hostile hands. In another embodiment, the device may shut down non-destructively. For example, the power supply may just power down, but may become operational again when a proper command input is received. In yet another embodiment, the device may continue to operate, but at a degraded capability.

While the subject of this specification has been described in connection with one or more exemplary embodiments, it is not intended to limit the claims to the particular forms set forth. On the contrary, the appended claims are intended to cover such alternatives, modifications and equivalents as may be included within their spirit and scope.

What is claimed is:

1. An image intensifier for use in a night vision system, the image intensifier comprising:
   a power supply circuit having a reference voltage and configured to provide:
   a screen voltage maintained at a substantially time-invariable direct current value,
   a microchannel plate input voltage switching between a maximum value and a minimum value,
   a microchannel plate output voltage maintained at a substantially time-invariant direct current voltage with respect to the microchannel plate input voltage, and switched in phase with the microchannel plate input voltage, and
   a photocathode voltage maintained at a substantially time-invariable direct current value;
   a photocathode receiving the photocathode voltage from the power supply circuit;
   a microchannel plate coupled to the photocathode and receiving the microchannel plate voltage from the power supply; and
   a screen coupled to the microchannel plate and receiving the screen voltage from the power supply;
   whereby the photocathode provides shielding against electromagnetic interference caused by switching of the microchannel plate voltage.

2. The image intensifier of claim 1 wherein the reference voltage is an electrical ground.

3. The image intensifier of claim 1 wherein the photocathode voltage is slightly above the reference voltage.

4. The image intensifier of claim 1 wherein the photocathode voltage is at the reference voltage.

5. The image intensifier of claim 1 wherein the screen voltage is approximately 5,800 V with respect to the reference voltage.

6. The image intensifier of claim 1 wherein the microchannel plate input voltage switches between a minimum in the range of approximately −1,000 V to 0 V with respect to the reference voltage, and a maximum in the range of approximately 100 V and 1,000 V with respect to the reference voltage.

7. The image intensifier of claim 6 wherein the minimum is approximately −16 V.

8. The image intensifier of claim 6 wherein the maximum is approximately 800 V.

9. The image intensifier of claim 1 further comprising:
   a mechanical housing surrounding the image intensifier, the mechanical housing being constructed of conductive material and being electrically shorted to an electrical ground.

10. The image intensifier of claim 1 wherein the magnitude of the total voltage drop across the microchannel plate is between 0 V and 1,200 V.

* * * * *